Patented Apr. 13, 1943

2,316,380

UNITED STATES PATENT OFFICE 2,316,380

POLYMERIZATION OF OLEFINS

Paul Woog, Paris, France; vested in the Alien Property Custodian

No Drawing. Application March 7, 1939, Serial No. 260,434. In France March 9, 1938

1 Claim. (Cl. 196—10)

This invention relates to polymerization of olefins, and it consists in a process of treating olefins with sulfuric acid to produce polymers, said process comprising continuously introducing an olefin, while in the gaseous state and at substantially atmospheric pressure, into a sulfuric acid solution, containing about 67 per cent sulfuric acid and 2 per cent silver sulfate and at a temperature of about 25 to 30° C. by passing the gas through a porous diaphragm disposed at such a depth in said solution that the resulting reaction is terminated at the moment when the gas bubbles leave the surface of the liquid, employing for that purpose a porous wall which cannot be attacked by the solution and having a sufficiently fine porosity to produce a real emulsion of said olefin in said acid, and separating the resulting polymerization product continuously at a rate corresponding to that at which it is produced, all as more fully hereinafter set forth and as claimed.

The substances which are used in the present process essentially comprise the isobutylene and butylene gases or the gaseous mixtures containing the same (petroleum cracking gas, reforming gas, pyrogenating gas, and the like). Said gaseous mixtures may be used such as they are, but it is preferable to submit the same to a known process (compression or cooling) in order to enrich the same in $C_4$ hydrocarbons.

It is well known, for instance from the classical works of A. Butlerov (Annalen; vol. 180; (1876) p. 247; vol. 189 (1877) p 48; Berichte vol. 12 (1879) page 1482) that isobutylene in the presence of sulfuric acid becomes hydrated and is converted into tertiary butyl alcohol, whereas by dehydration and polymerisation of said alcohol, diisobutylene is obtained.

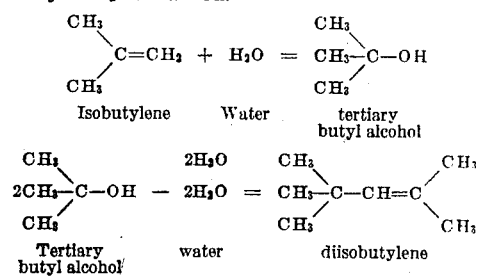

Moreover, it is known that through hydrogenation, the diisobutylene yields isooctane:

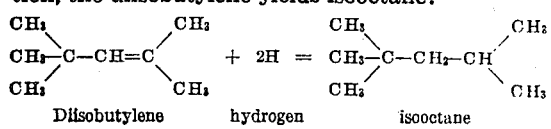

Various means have been described for utilising said reactions which, generally speaking, are effected separately and successively. The process which forms the object of the present invention is related to said known processes, but involves a new technic leading to a simplification. The operations take place generally at a temperature close to the ordinary temperature and ranging between 0° and 100° C., at atmospheric pressure to which is simply added the pressure which is required by the gases for passing into the reagents. A good yield is obtained in treating any source of gas.

The process is essentially characterised by the fact that the gases are brought into an exceedingly intimate contact with a sulphuric acid solution, which considerably facilitates, in a surprising manner, the reactions. Said reactions take place when use is made of an acid of a suitable concentration, at the ambient temperature or at a temperature between 0° to 100° C. The actions are complete in a single step, the hydration of the isobutylene and the dehydration of the alcohol taking place in the same operation. In this way, the gases are first introduced into the reagent and the liquid diisobutylene which forms a supernatant layer on the acid solution is collected in a continuous manner. It is then only necessary to hydrogenate said liquid. The increased efficiency obtained by the extreme subdivision of the gases is shown by the fact that if one passes the gases into the reagents through an ordinary contact or bubbling device, the reaction is incomplete and the amount of liquid product which is formed is about ten times smaller.

Another advantage of the invention consists in that it considerably reduces the space occupied by the apparatus and consequently the cost price of manufacturing plants.

Various concentrations of acid may be used (substantially from 10% to 100%); and for every one of said concentrations, the most favourable temperature should be maintained. For instance, with a solution containing 67% of sulphuric acid, the optimum temperature is about 25° to 30° C.

In order to obtain an extreme subdivision of the gases and their intimate contact with the solution of sulphuric acid it is preferred to use a porous plate.

In this case, the gases are injected into the reagent through porous plates which cannot be attacked by the acid solution (porous ceramic plates, calcined porcelain, agglomerated glass grains, and the like). The pores must be sufficiently fine to allow the gases to form a true emulsion with the liquid, which emulsion should become dissolved only at the upper part of the solution. The pressure of the injected gases must be regulated so that the bubbles floating in the liquid will not agglomerate and will maintain their individuality until they burst at the upper part of the acid solution. The height of said solution must be selected so that the reactions will have time to take place during the ascent of the bubbles. This height is not great and a thickness of liquid ranging between 15 and 50 cm. is generally sufficient. This small height moreover permits superimposing of reaction vessels so as to reduce the space occupied by the plant. The liquid hydrocarbons as formed have a density which is considerably lower than that of the acid solution, they float over the latter and a waste-pipe permits withdrawal and collection of the polymerised products as soon as they are produced.

An increase of yield can be obtained by introducing a small amount of silver sulfate as catalyst into the sulfuric acid solution. Should the gases contain some impurity capable of altering the catalyst, said gases should be subjected to a previous purification. Such is the case, for instance, with sulphur-containing gases. Such gases should be washed with an alkaline solution, for example, before their treatment, so as to avoid the sulphuration of the catalyst and the formation of insoluble flakes of silver sulphate.

It has been indicated that the reactions taking place starting from isobutylene are effected in one single operation. Substantially pure isobutylene, this gas is accompanied in a quite general manner by other $C_4$ hydrocarbons, i. e. the butenes. Treatment of the latter may be carried out by two different methods.

1st. In regulating the concentration of the acid solution, the catalyst and the temperature in such a manner that at the moment of polymerization a molecule of isobutylene and a molecule of butene combine themselves and replace the union of two molecules of isobutylene together. It will be possible, for example, to conduct the reactions in that manner by treating the gases at 30° with a solution containing 67% of sulphuric acid and about 2% of silver sulphate. It is possible, even in this process, to replace the butenes by nonsaturated $C_4$ hydrocarbons other than the hydrocarbons, such as propylene, for example.

2nd. In regulating the reactions so that isobutylene is the only gas polymerized. In this case, the butenes first pass through the acid solution without being retained and can be collected at the outlet. These gases rich in butene are then submitted to a new treatment with a suitable solution and by means of a device which is similar to the one which has been described. The solution may for example be constituted by sulphuric acid at 78%. Under these conditions, secondary butylic alcohol is formed. Said product is then collected and caused to pass over alumina at from 500 to 520° C. according to known technics. By this means the alcohol is converted by dehydration into isobutylene which is conveyed into the first circuit.

In the reactions which have been described, the process of polymerization gives rise, in a general manner, simultaneously to several polymerides which may exist in quite different proportions. For example, the presence of diisobutylenes (2-2-4 trimethyl 1-pentene and 2-2-4 trimethyl-II-pentene); of tri-isobutylenes, and of higher isobutylenes has been ascertained.

The conditions of the reaction (concentration of acid, temperature, catalyst) can be so chosen as to produce the synthesis of the desired polymeride and it is possible to obtain products containing high proportions of the desired hydrocarbon, which hydrocarbon may be purified by any suitable means. But, when it is only desired to obtain fuels having a high antiknocking power, a more simple method may be adopted, that is to say the production of a mixture of polymerides the hydrogenation of which gives a fuel which in its turn is constituted by a mixture of hydrocarbons and which can be used without being specially treated either alone or in addition to oils for feeding engines.

I claim:

A process for polymerizing olefins by treatment with sulfuric acid which comprises continuously introducing an olefin, while in the gaseous state and at substantially atmospheric pressure, into a sulfuric acid solution, containing about 67 per cent sulfuric acid and 2 per cent silver sulfate and at a temperature of about 25 to 30° C. by passing the gas through a porous diaphragm disposed at such a depth in said solution that the resulting reaction is terminated at the moment when the gas bubbles leave the surface of the liquid, employing for that purpose a porous wall which cannot be attacked by the solution and having a sufficiently fine porosity to produce a real emulsion of said olefin in said acid, and separating the resulting polymerization product continuously at a rate corresponding to that at which it is produced.

PAUL WOOG.